United States Patent
Scaramucci

[15] 3,666,233
[45] May 30, 1972

[54] BUTTERFLY VALVE ASSEMBLY HAVING SPLIT BODY

[72] Inventor: Domer Scaramucci, 3245 South Hattie, Oklahoma City, Okla. 73129

[22] Filed: May 6, 1970

[21] Appl. No.: 35,161

[52] U.S. Cl..............................251/151, 251/306, 251/367
[51] Int. Cl.................................................F16k 1/22
[58] Field of Search..................251/148, 306, 151, 152, 367

[56] References Cited

UNITED STATES PATENTS

| | | | |
|---|---|---|---|
| 3,517,689 | 6/1970 | Roos | 251/306 X |
| 3,534,939 | 10/1970 | Frazier et al. | 251/306 |
| 3,329,398 | 7/1967 | Goldsmith | 251/306 |
| 3,376,015 | 4/1968 | Forsman et al. | 251/306 |
| 2,936,778 | 5/1960 | Stillwagon | 251/306 X |
| 3,531,082 | 9/1970 | Scaramucci | 251/306 |

*Primary Examiner*—William R. Cline
*Attorney*—Dunlap, Laney, Hessin & Dougherty

[57] ABSTRACT

A valve assembly for use between pipe flanges employing an operating housing radially supporting the valve body of a butterfly or disc type valve, as well as supporting the valve operator. The valve body is in the form of two rings shaped to support the stems of the disc valve member and form at least one seat for the valve member. An elastomer lining is formed around the inner periphery of each ring and forms a seal with the respective pipe flange to isolate the operating housing from the fluid being controlled. Also, the linings cooperate to form stem seals. Various arrangements and shapes of seats are provided by the linings.

15 Claims, 9 Drawing Figures

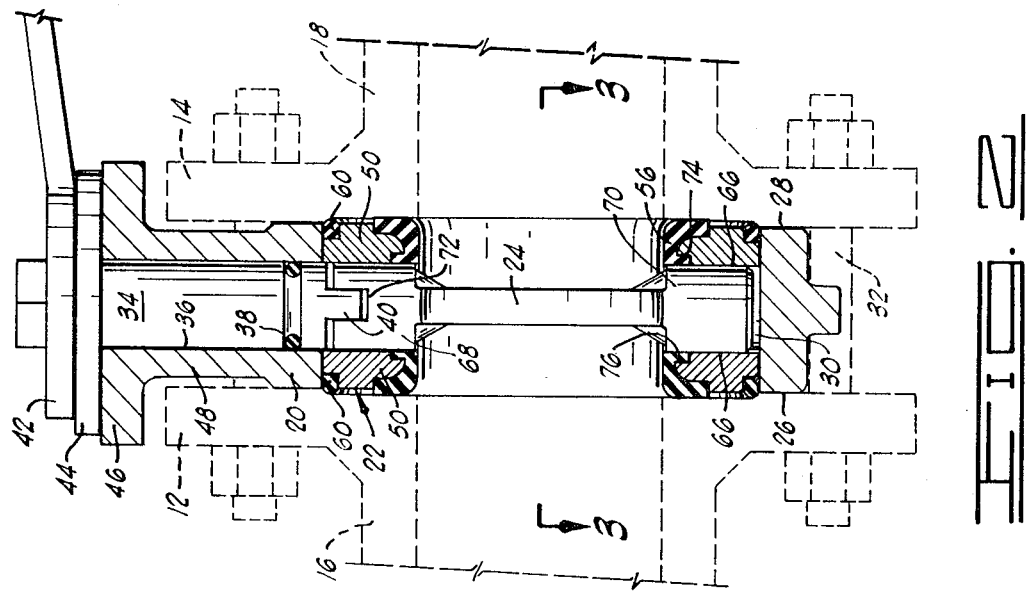
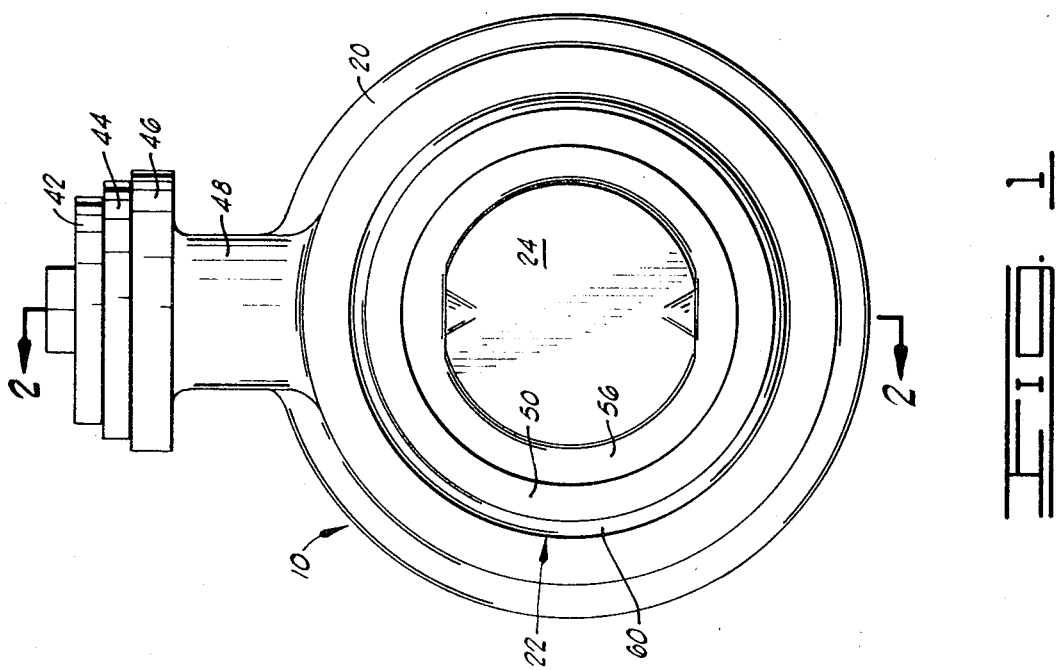

INVENTOR
DOMER SCARAMUCCI
BY
Dunlap, Laney, Hessin & Dougherty
ATTORNEYS

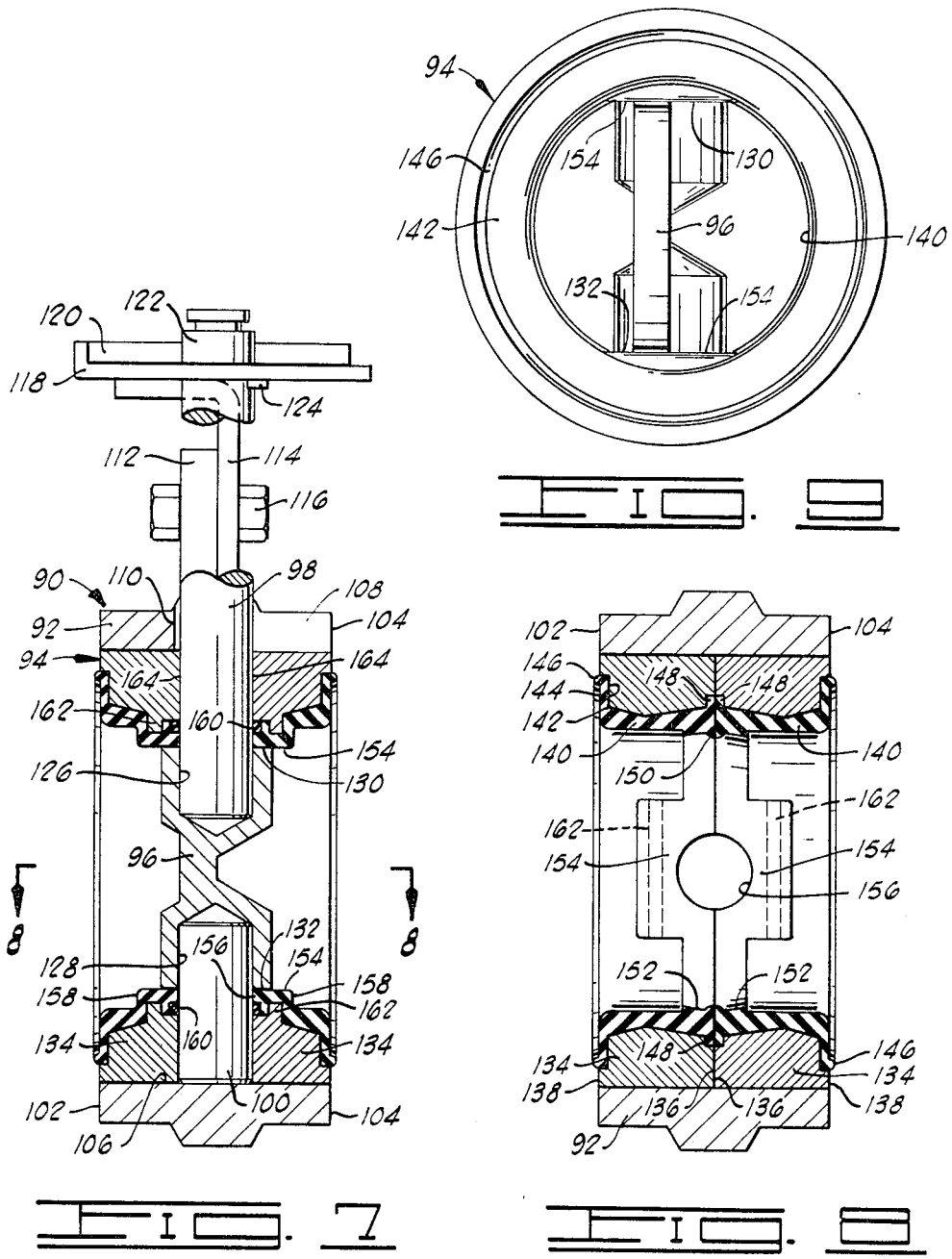

3,666,233

BUTTERFLY VALVE ASSEMBLY HAVING SPLIT BODY

CROSS REFERENCES TO RELATED APPLICATIONS

Related subject matter is disclosed in applicant's copending applications Ser. No. 763,644 filed Sept. 30, 1968, entitled "Valve Assembly With Insertable Valve Unit" now U.S. Pat. No. 3,531,081; Ser. No. 781,310 filed Dec. 5, 1968, entitled "Valve Assembly With Drop Type Stem"; Ser. No. 847,564 filed Aug. 5, 1969, entitled "Disc Valve Assembly with Insertable Valve Member and Seats" now U.S. Pat. No. 3,601,364; Ser. No. 847,628 filed Aug. 5, 1969, entitled "Disc Valve Assembly With Replaceable Disc and Seats" now U.S. Pat. No. 3,601,359; Serial No. 797,069 filed Feb. 6, 1969, entitled "Valve Assembly With Replacement Valve Unit" now U.S. Pat. No. 3,556,473.

BACKGROUND OF THE INVENTION

1. Field of the Invention

This invention relates generally to improvements in valves, and more particularly, but not by way of limitation, to an improved butterfly valve.

2. Description of the Prior Art

As it is well known in the art, those portions of a butterfly valve which are normally the first to fail are the seat or seats and the stem seals. Various designs have been developed in the light of this problem, but up to the present time, none have been entirely satisfactory. For example, when the seat or seats are molded in a reinforcing ring insertable lengthwise in the valve body and extending throughout the length of the valve body, the valve stem or stems must be removed when replacing the liner, frequently causing damage of the stem seal. When replaceable seats have been employed in the past, renewal of the stem seal has required a virtually complete disassembly of the valve.

SUMMARY OF THE INVENTION

An object of this invention is to provide a butterfly valve construction wherein the seats and stem seals may be easily replaced in a minimum of time and without a complete disassembly of the valve.

Another object of this invention is to provide a valve assembly wherein the valve body may be formed of the most economical materials.

A further object of this invention is to provide a valve assembly wherein the valve body is radially supported by a surrounding operating housing and the fluid being controlled does not contact the operating housing.

Another object of this invention is to provide a butterfly valve having dual seats wherein the seats may be used alternately by turning the valve member through approximately 180°.

A still further object of this invention is to provide an economically constructed butterfly valve assembly.

Other objects and advantages of the invention will be evident from the following detailed description when read in conjunction with the accompanying drawing.

BRIEF DESCRIPTION OF THE DRAWING

FIG. 1 is an end elevational view of a valve assembly constructed in accordance with this invention, FIG. 2 is a vertical sectional view taken along lines 2—2 of FIG. 1, with the addition of pipe flanges shown in dashed lines, FIG. 7 is another view similar to FIG. 2, without the pipe flanges, of another modified construction, FIG. 8 is a sectional view as taken along lines 8—8 of FIG. 7, with the valve disc removed, and FIG. 9 is an end elevational view of the valve body employed in the structure shown in FIGS. 7 and 8.

DESCRIPTION OF THE PREFERRED EMBODIMENTS

Figure 3:
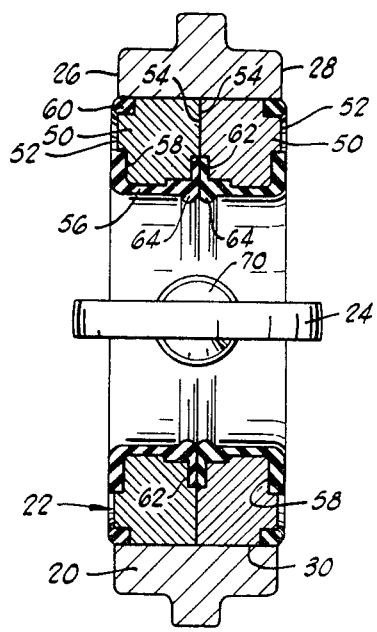
FIG. 3 is a sectional view taken along lines 3—3 of FIG. 2 with the valve disc in an open position.

Referring to the drawing in detail, and particularly FIGS. 1 and 2, reference character 10 generally designates a valve assembly constructed in accordance with this invention and adapted to fit between a pair of pipe flanges 12 and 14 to control fluid flowing through adjacent sections 16 and 18 of a conduit secured to the flanges 12 and 14, respectively. The valve assembly 10 basically comprises an operating housing 20 containing a valve body 22 and a valve disc 24.

The opposite end faces 26 and 28 of the operating housing 20 are preferably flat to mate with the faces of the respective flanges 12 and 14, and a bore 30 extending lengthwise through the operating housing and intersecting the end faces 26 and 28 is positioned in alignment with the conduit sections 16 and 18. The outer periphery of the operating housing 20 is sized such that the usual bolts 32 interconnecting the flanges 12 and 14 will surround and support the operating housing.

A first valve stem 34 extends through and is journaled in a mating aperture 36 formed transversely through the upper portion of the operating housing 20 at a right angle to the bore 30. An O-ring 38 is preferably positioned in a mating circumferential groove extending around the valve stem 34 to sealingly engage the walls of the aperture 34 and form a secondary stem seal as will be further described. The lower or inner end of the stem 34 is provided with a rectangular projection 40 for purposes to be described. The upper or outer end of the stem 34 is provided with a suitable valve operator, such as a handle 42 mating with an indexing plate 44 in the usual manner. The indexing plate 44 is secured to a flange 46 formed at the outer end of a neck 48 extending transversely from the main body portion of the operating housing 20 to position the handle 42 remote from the flanges 12 and 14.

As shown most clearly in FIG. 3, the valve body 22 comprises a pair of identical rings 50 of relatively rigid material, such as metal, each of which has what may be considered an outer end face 52 and an inner end face 54. Each ring 50 has an outer diameter of a size such that the ring may be slid lengthwise into the bore 30 of the operating housing, and each ring 50 has a length substantially equal to one-half the length of the operating housing, such that when the rings 50 are assembled in the operating housing with the inner end faces 54 thereof in abutting relation, the outer end faces 52 of the rings will be substantially coterminus with the end faces 26 and 28 of the operating housing.

An elastomeric lining 56 is molded around the inner periphery of each ring 50. Each lining 56 is preferably a rubber or rubber-like composition and is preferably molded in place in the respective ring 50 to enhance the adhesion of the lining to the ring. Each lining 56 extends over a portion of the outer end face 52 of the respective ring and is molded in a mating groove 58. As can be clearly seen in FIG. 3, that portion of the elastomeric material positioned in each groove 58 extends beyond the respective end face 52 of the respective ring 50 to sealingly engage the respective pipe flange when the valve assembly 10 is assembled between the pipe flanges 12 and 14 (FIG. 2)and thereby prevent the fluid being controlled from contacting the operating housing 20. A secondary seal 60 in the form of an O-ring is also preferably provided in a mating groove at the outer periphery of the end face 52 of each ring 50 to engage the respective pipe flange and further assure that the fluid being controlled does not contact the operating housing. The lining 56 also extends over a portion of the inner end face 54 of each ring 50 and is bonded in a mating groove 62 of the respective ring 50. Those portions of the linings 56 positioned in the grooves 62 are sized to be in interference when the inner end faces 54 of the rings 50 are in engagement to assure that the fluid being controlled does not migrate radially out between abutting end faces 54 and contact the operating housing. It will also be observed in FIG. 3 that each lining 56 is provided with a sealing bead 64 on the inner periphery of the lining adjacent the end face 54 of the respective ring 50. The sealing beads 64 form a valve seat and are arranged to be engaged by the outer periphery of the disc 24 when the disc is in a closed position as clearly shown in FIG. 4.

As shown in FIG. 2, the abutting end face of each ring 50 is provided with a pair of diametrically opposed partial bores 66. The partial bores 66 in each ring 50 cooperate with the partial bores 66 in the opposite ring 50 to form journals for a pair of valve stems 68 and 70. The valve stems 68 and 70 are preferably formed integrally with the valve disc 24 and extend from diametrically opposed portions of the disc. It will also be observed in FIG. 2 that the distance from the outer end of the valve stem 68 to the outer end of the valve stem 70 is less than the outer diameter of the rings 50, such that the valve stems 68 and 70 will be disposed wholly within the valve body 22. A rectangular groove 72 is formed in the outer end of the valve stem 68 to receive the rectangular end 40 of the valve stem 34 when the complete valve is assembled in order that turning of the handle 42 will result in turning of the valve disc 24.

A counterbore 74 is formed in the inner end of each of the valve stem journals provided by the partial bores 66, and each lining 56 is extended into the portion of each counterbore 74 formed in the respective ring 50 to form an aperture 76 of a diameter less than the diameter of the respective valve stem 68 or 70 when the linings 56 are relaxed, such that the linings 56 will be distorted by the valve stems when the valve is assembled and will form effective valve stem seals to prevent the fluid being controlled from migrating outwardly through the valve stem journals into contact with the operating housing 20.

In assembling the valve assembly 10, the valve stem 34 is installed in the aperture 36 with the sealing ring 38 thereon and the handle 42 and indexing plate 44 are assembled as shown in FIG. 2. The valve disc 24 having the valve stems 68 and 70 attached thereto is then inserted in the operating housing with the groove 72 in the valve stem 68 receiving the rectangular end 40 of the valve stem 34. The disc 24 is then preferably positioned in an open position as illustrated in FIG. 3. The rings 50 are then inserted in the opposite ends of the operating housing bore 30 to place the ends 54 of the rings in abutting relation and place the valve stem journals formed by the partial bores 66 around the valve stems 68 and 70. The entire assembly 10 is then positioned between the pipe flanges 12 and 14 and the bolts 32 are tightened to bring the pipe flanges into engagement with the opposite end faces of the operating housing. The pipe flanges 12 and 14 will therefore also engage and deform the sealing rings 60 and the portions of the linings 56 overlapping the outer ends of the rings 50 until the pipe flanges are brought into engagement with the outer ends of the rings 50.

Figure 4:
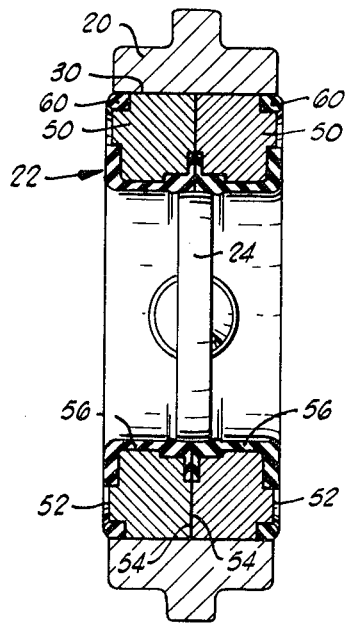
FIG. 4 is a view similar to FIG. 3 showing the disc in a closed position.

The valve is then ready for use in the conventional manner wherein the disc 24 is turned in the position shown in FIG. 3 to open the valve and the disc is turned approximately 90° to the position shown in FIG. 4 to engage the sealing beads 64 and close the valve. In all operating positions of the disc 24, the fluid being controlled will be effectively sealed off from the operating housing 20, such that the operating housing 20 may be constructed of the most economical material having the necessary strength requirements, even though the fluid being handled may be highly corrosive. It may also be noted that when the valve is closed, the load imposed on the disc 24 by the fluid being controlled will be carried by the ring 50 on the downstream side of the disc.

In the event either the valve seat provided by the sealing beads 64, or the valve stem seals provided by the linings 56 engaging the valve stems 68 and 70 become defective through use, it is simply necessary to remove the valve assembly 10 from between the pipe flanges 12 and 14 and replace the rings 50 with new rings. It may also be noted that the rings 50 may have a relatively loose sliding fit in the bore 30 of the operating housing and the machine tolerances on the rings is not rigid, such that the rings may be economically constructed and the linings molded in place. Since the distance from the outer end of the valve stem 68 to the outer end of the valve stem 70 is less than the outer diameter of the valve body 22, and thus less than the diameter of the operating housing bore 30, the valve disc 24 will be free to float vertically a limited distance to effectively engage the sealing beads 64 of the rings 50 and provide an effective closure of the valve. It should further be noted that since the linings 56 effectively shield the rings 50 from the fluid being controlled, the rings 50 may also be formed of the most economical material even though corrosive fluids are being handled.

Figure 5:
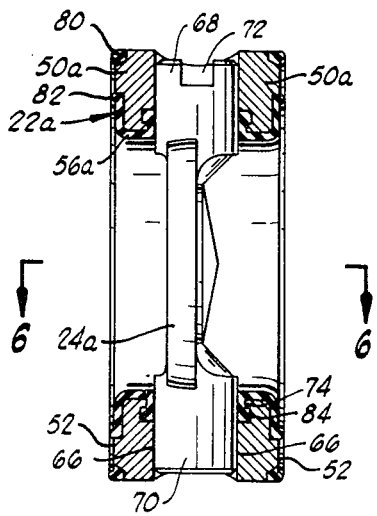
FIG. 5 is a view similar to FIG. 2, without the operating housing and pipe flanges, illustrating a modified construction.
Figure 6:
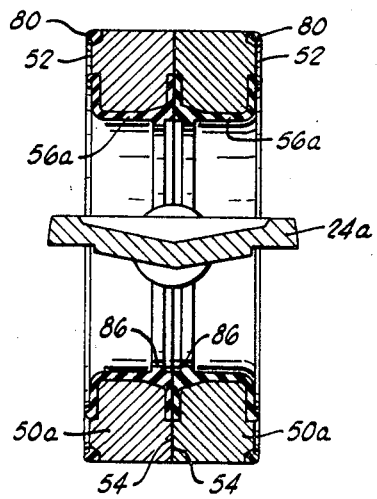
FIG. 6 is a sectional view taken along lines 6—6 of FIG. 5.

Embodiment of FIGS. 5 and 6

The modified valve body 22a and modified disc 24a shown in FIGS. 5 and 6 may be used in the operating housing 20 previously disclosed. The modified disc 24a is offset from the center-lines of its valve stems 68 and 70, rather than being in line with the centerlines of the stems as in the disc 24 previously described. The modified valve body 22a comprises a pair of slightly modified rings 50a which are modified only slightly from the structure previously described. Rather than using O-rings 60 in the outer end faces 52 of the rings 50a, an elastomeric material 80 in the form of a ring is bonded in a mating groove at the outer periphery of the respective end face 52 to form a sealing bead projecting beyond the respective end face 52 in a position to sealingly engage the respective pipe flange 12 or 14 when the valve is assembled between the flanges as previously described.

The elastomeric lining 56a bonded around the inner periphery of each of the modified rings 50a is constructed in substantially the same manner as the linings 56 previously described, except that a sealing bead 82 is molded on what may be considered the outer end of each lining 56a to form a pronounced sealing bead which will engage the respective pipe flange 12 or 14 when the valve is assembled. Each lining 56a is also modified in that it extends into an undercut 84 formed at the outer end of each counterbore 74 formed in the rings 50a around each of the valve stems 68 and 70 to further assure that the modified linings will not be torn away from the modified rings and the linings will form more effective stems seals around the valve stems 68 and 70.

Each modified lining 56a is further modified in having a seating surface 86 of substantially uniform diameter formed around the inner periphery of the respective lining adjacent the inner face 54 of the respective ring 50a. The seating surfaces 86 are sized to engage the outer periphery of the modified disc 24a and provide two closing positions for the disc. When the disc is in the position shown in FIG. 5, the disc will engage the left hand seating surface 86 illustrated in FIG. 6, and when the disc 24a is turned through approximately 180°, the disc will sealingly engage the right hand seating surface 86 shown in FIG. 6. Thus, if one of the seating surfaces 86 becomes worn through use, it is simply necessary to turn the disc 24a through 180° and a new seat will be provided.

The modified structure illustrated in FIGS. 5 and 6 is installed in the operating housing 20 in the same manner as the valve body and disc structure illustrated in FIGS. 1 through 4 and will effectively shield the operating housing from the fluid being controlled.

Embodiment of FIGS. 7-9

Another modified valve assembly, generally designated by the reference character 90, is illustrated in FIGS. 7, 8, and 9 and basically comprises an operating housing 92, a valve body generally designated by the reference character 94, and a disc 96 supported in the valve body by a pair of valve stems 98 and 100.

The operating housing 92 has substantially flat opposite end faces 102 and 104 and a bore 106 extending lengthwise therethrough intersecting the end faces 102 and 104. A slot 108 is formed in the operating housing 92 extending from the end 104 to a point 110 beyond the center of the operating housing of a size to loosely receive the valve stem 98 when the valve is being assembled, as will be further described. An arm 112 extends upwardly from the operating housing 92 and has a second arm 114 secured thereto by suitable fasteners 116 to support an indexing plate 118. The indexing plate 118 cooperates and supports a handle 120 in the usual manner. The handle 120 is suitably secured to the upper end 122 of the valve stem 98. A retaining ring 124 is seated in a mating groove formed in the outer periphery of the valve stem 98 to engage the lower face of the indexing plate 118 and hold the valve stem 98 in a fixed vertical position with respect to the operating housing 92.

The disc 96, as is shown in FIGS. 7 and 9, is of the offset type and has a pair of diametrically opposed sockets 126 and 128 formed therein to receive the valve stems 98 and 100. The valve stem 98 is suitably secured in its socket 126 in any suitable manner, such as by the use of cooperating flat surfaces, in order that the disc 96 will be turned upon turning of the valve stem 98. It will also be observed in FIGS. 7 and 9 that that portion of the disc 96 at the outer end of each of the sockets 126 and 128 is flat to provide a pair of diametrically opposed flat surfaces 130 and 132 on the disc extending at a right angle to the plane of the disc for purposes to be described.

The valve body 94 comprises a pair of rings 134 of a relatively rigid material, such as metal, of a size to slidingly fit in the opposite ends of the operating housing bore 106. As shown in FIG. 8, each ring 134 has a length equal to substantially one-half the length of the operating housing 92, such that when the inner ends 136 of the rings are in abutting relation in the operating housing, the outer ends 138 of the rings will be substantially coterminus with the outer end faces 102 and 104 of the operating housing.

A lining 140 of elastomeric material is bonded around the inner periphery of each of the rings 134. Each lining 140 is a rubber or rubber-like composition and is preferably molded in place in the respective ring 134 to enhance the adhesion of the lining to the ring. The outer end portion 142 of each lining 140 overlaps the outer end 138 of the respective ring 134 and is bonded in a mating groove 144 formed in the ring. Also, the extreme outer end of each lining 140 preferably has a sealing bead 146 molded thereon to project beyond the end face 138 of the respective ring 134 and cooperate with a mating pipe flange (not shown) in the same manner as previously described to shield the operating housing 92 from the fluid being controlled by the valve assembly. The inner end portion 148 of each lining 140 also overlaps a small portion of the inner end 136 of the respective ring 134 and is bonded in a mating groove. The end portions 148 of the linings 140 preferably project slightly beyond the inner end faces of the respective rings 134 to be placed in interference when the end faces 136 are in abutting relation to form an effective seal and prevent the possible migration of the fluid being controlled radially outwardly between the abutting end faces 136. The interference provided between the lining portions 148 will result in a slight bulge 150 at the central portion of the inner periphery of the valve body 94 when the rings 134 are assembled, but this bulge 150 will not be of a size to interfere with the operation of the disc 96.

Each lining 140 has a seating surface 152 formed on the inner periphery thereof extending from the inner end 136 of the respective ring 134. The seating surfaces 152 are preferably frusto-conical in cross-section with the larger diameter end of each seating surface being adjacent the inner end face 136 of the respective ring 134. The seating surfaces 152 are of a size to be engaged by the outer periphery of the disc 96 and provide dual seats for the valve, as will be further described.

As shown in FIG. 8, each seating surface 152 merges into a flat surface 154 adjacent each of the valve stems 98 and 100, thereby providing two sets of diametrically opposed flat surfaces 154 in the linings 140. It may also be stated that the surfaces 154 are flat in the sense of being parallel with the flat surfaces 130 and 132 of the valve disc 96. A partial aperture is formed in each lining 140 at the central portion of each flat surface 154 to form a pair of valve stem openings 156 to receive the valve stems 98 and 100. Each of the apertures 156 has a diameter, in the relaxed conditions of the linings 140, less than the diameter of the respective valve stem in order that the linings will form effective valve stem seals around both of the stems 98 and 100. The distance (see FIG. 7) from the flat surfaces 154 associated with the flat end 130 of the disc 96 and the flat surfaces 154 associated with the flat surface 132 of the valve disc 96 is less than the distance between the valve disc surfaces 130 and 132, such that the valve disc will have an interference fit in the linings 140 around the valve stems 98 and 100 to further enhance the effectiveness of the stem seals provided by the linings. Finally it should be noted that the flat surfaces 154 project radially inwardly from the remainder of the linings 140 to present shoulders 158 exposed to the pressure of the fluid being controlled. Such pressure will react on the shoulders 158 and tend to urge the elastomeric material of the linings 140 more tightly around the valve stems 98 and 100, thereby enhancing the effectiveness of the stem seals. An O-ring 160 is also preferably fitted in a mating groove in each aperture 156 to sealingly engage the respective valve stem 98 or 100.

A flange 162 is formed on the inner periphery of each ring 134 underlying each flat surface 154 of the respective lining 140. Each flange 162 is spaced outwardly from the respective O-ring 160 and tends to trap the elastomeric material positioned between the O-ring 160 and the flange, as well as trapping the respective O-ring 160, when the valve disc 96 is assembled in the valve body to keep the elastomeric material wedged against the respective valve stem 98 or 100.

A pair of diametrically opposed partial bores 164 are formed in the inner end face 136 of each of the rings 134. The partial bores 164 of each ring mate with partial bores 164 of the opposite ring to form valve stem journals receiving and supporting the valve stems 98 and 100.

In assembling the valve assembly 90, the stems 98 and 100 are inserted in the sockets 126 and 128 of the disc 96 and the O-rings 160 are placed on the valve stems 98 and 100. The rings 134 may then be placed on the opposite sides of the valve stems 98 and 100 with the partial bores 164 receiving the valve stems and with the O-rings 160 fitting in the mating grooves in the liner apertures 156; whereupon these structures just described may be inserted as a whole into the operating housing 92 with the valve stem 98 moving through the slot 108, and the indexing plate 118, handle 120 and bracket 114 installed as shown in FIGS. 7. In the alternative, the valve stems 98 and 100 having the disc 96 connected thereto may be first inserted in the operating housing 92 and then the rings 134 assembled around opposite sides of the valve stems and O-rings 160 within the operating housing. The entire valve assembly 90 is then inserted between adjacent pipe flanges, such as the pipe flanges 12 and 14 previously referred to in connection with FIG. 2, and the pipe flanges brought into engagement with the opposite end faces 102 and 104 of the operating housing 92. The pipe flanges will therefore also be brought into engagement with the outer ends 138 of the rings 134 to deform the sealing beads 146 for the purpose previously described.

In operation of the valve assembly 90, the valve disc 96 will cooperate with one of the seating surfaces 152, such as the left hand seating surface 152 shown in FIG. 8, to close the valve. In the event that seating surface 152 becomes worn, the handle 120 may be turned approximately 180° to position the disc 96 in the remaining seating surface 152 to again close the valve.

It will be apparent that the linings 140, along with the O-rings 160, prevents the fluid being controlled from contacting either the operating housing 92 or the rings 134. Thus, the operating housing 92 and the rings 134 may be made of an economical material, even though the valve may be handling corrosive fluids. It may also be noted that the flanges 162 of the rings 134 will retain the elastomeric material around the apertures 156, as well as the O-rings 160, tightly in engagement with the valve stems when the rings 134 are assembled as shown in the drawing.

In the event both of the seating surfaces 152 may become worn, or in the event the stem seals fail to function in the desired manner, the rings 134 may be easily replaced by being slid lengthwise out of the operating housing 92. The O-rings 160 are not likely to be damaged or worn, but in the event they fail to function properly, they may be easily replaced by removing the assembly comprising the valve stems 98 and 160 and the disc 96 from the operating housing in a manner reversed to that described above for the assembly operation.

From the foregoing it will be apparent that the present invention provides a butterfly valve construction wherein the seats and stem seals may be easily replaced; the valve body may be formed of the most economical materials; the valve body is radially supported by a surrounding operating housing and the fluid being controlled does not contact the operating housing; the valve may have dual seats wherein the seats may be used alternately by turning the valve member approximately 180°, and the assembly may be economically constructed.

Changes may be made in the combination and arrangements of parts or elements as heretofore set forth in the specification and shown in the drawing without departing from the spirit and scope of the invention as defined in the following claims.

What is claimed is:

1. A valve assembly for use between a pair of pipe flanges, comprising:

an operating housing having opposite end faces and a bore extending therethrough intersecting said end faces;

means for supporting the housing between the pipe flanges with the end faces of the housing engaging the pipe flanges and the housing bore aligned with the pipe flanges;

first and second relatively rigid rings of a size to slide lengthwise into the opposite ends of the housing bore into abutting relation to form a valve body, the abutting ends of said rings having diametrically opposed and mating partial bores therein forming diametrically opposed valve stem journals at the opposite sides of the valve body;

a valve disc in the valve body;

valve stem means secured to the valve disc and rotatably supported in and by said journals, whereby one of said rings supports the load applied to the disc when the disc is closed;

means journaled in the operating housing and connected to the valve stem means for rotating the valve disc to an open and a closed position; and an elastomer lining bonded around the inner periphery of each ring extending over a portion of the non-abutting end of the respective ring and protruding beyond the respective end of the housing when the rings are in assembled relation to sealingly engage the respective pipe flange, said linings being shaped to provide an aperture aligned with each valve stem journal having a diameter less than the diameter of the respective stem means to form a stem seal, and one of said linings being shaped to provide an annular seat for the disc.

2. A valve assembly as defined in claim 1 wherein the lining in each ring extends over a portion of the abutting end of the respective ring, whereby said linings are placed in interference when the rings are in abutting relation.

3. A valve assembly as defined in claim 1 characterized further to include an O-ring imbedded in each aperture provided by the linings sealingly engaging the respective stem means.

4. A valve assembly as defined in claim 1 characterized further to include an elastomer sealing ring positioned in a mating groove in the non-abutting end of each ring adjacent the outer periphery of the ring to sealingly engage the respective pipe flange.

5. A valve assembly as defined in claim 1 wherein the disc has diametrically opposed flat surfaces on the outer periphery thereof around the stem means, the linings are shaped to provide corresponding flat surfaces spaced apart a distance less than the distance between the flat surfaces on the disc to provide an interference fit between the flat surfaces on the disc and the flat surfaces on the linings.

6. A valve assembly as defined in claim 5 characterized further to include a pair of diametrically opposed radially inwardly extending flanges in each ring imbedded in those portions of the respective lining forming said flat surfaces, each of said ring flanges being spaced from the respective partial bore forming a portion of a valve stem journal.

7. A valve assembly as defined in claim 6 characterized further to include an O-ring imbedded in the linings around each lining aperture between the respective flanges extending radially inward from the rings.

8. A valve assembly as defined in claim 1 wherein each lining is shaped to provide an annular seating surface for the disc.

9. A valve assembly as defined in claim 8 wherein the disc is offset from the centerlines of the stem means and positioned to alternately engage said seating surfaces when the disc is turned about 180°.

10. A valve assembly as defined in claim 1 wherein the stem means comprises first and second stems extending from diametrically opposed portions of the disc.

11. A valve assembly as defined in claim 10 wherein the stems and disc are integrally formed.

12. A valve assembly as defined in claim 8 wherein each seating surface is in the form of a sealing bead.

13. A valve assembly as defined in claim 8 wherein each seating surface is in the form of a raised annular ring having a substantially uniform diameter around the inner periphery thereof.

14. A valve assembly as defined in claim 9 wherein each seating surface is frusto-conical in cross-section having a larger diameter adjacent the centerlines of the stem means.

15. A valve assembly as defined in claim 1 wherein each lining is molded-in-place on its respective ring.

* * * * *